US012305421B2

(12) United States Patent
Pollnow et al.

(10) Patent No.: US 12,305,421 B2
(45) Date of Patent: May 20, 2025

(54) PUSH BUTTON LOCK

(71) Applicant: STRATTEC SECURITY CORPORATION, Milwaukee, WI (US)

(72) Inventors: Scott T. Pollnow, Kewaskum, WI (US); Andrew Noel Goodman, Whitefish Bay, WI (US); Kurtis L Cherek, Rubicon, WI (US)

(73) Assignee: STRATTEC SECURITY CORPORATION, Milwaukee, WI (US)

( * ) Notice: Subject to any disclaimer, the term of this patent is extended or adjusted under 35 U.S.C. 154(b) by 142 days.

(21) Appl. No.: 18/118,421

(22) Filed: Mar. 7, 2023

(65) Prior Publication Data

US 2024/0003163 A1 Jan. 4, 2024

Related U.S. Application Data

(60) Provisional application No. 63/357,129, filed on Jun. 30, 2022.

(51) Int. Cl.
*E05B 13/10* (2006.01)

(52) U.S. Cl.
CPC .................................. *E05B 13/105* (2013.01)

(58) Field of Classification Search
CPC .. E05B 1/0038; E05B 13/105; E05B 27/0046; E05B 29/00; E05B 29/0006; E05B 33/00; E05B 63/22
See application file for complete search history.

(56) References Cited

U.S. PATENT DOCUMENTS

| | | | | |
|---|---|---|---|---|
| 5,799,520 A * | 9/1998 | Laabs | H01H 9/285 200/318.2 |
| 6,523,378 B2 * | 2/2003 | Kuo | E05B 1/0038 70/370 |
| 6,782,725 B2 * | 8/2004 | Linares | E05B 13/105 70/DIG. 37 |
| 7,126,066 B1 | 10/2006 | Corcino et al. | |
| D532,674 S | 11/2006 | Schwalie et al. | |
| 7,205,792 B2 | 4/2007 | Corcino et al. | |
| 7,409,842 B2 * | 8/2008 | Kuo | E05B 13/105 70/58 |
| 8,084,701 B1 * | 12/2011 | Misner | H01H 27/06 200/566 |
| 8,561,441 B2 * | 10/2013 | Herrmann | E05C 3/30 292/108 |
| 8,756,963 B2 * | 6/2014 | Le | E05C 1/14 292/DIG. 37 |

(Continued)

*Primary Examiner* — Kristina R Fulton
*Assistant Examiner* — Noah Horowitz
(74) *Attorney, Agent, or Firm* — Michael Best & Friedrich LLP

(57) ABSTRACT

A push button lock an outer case and a button assembly movable relative to the outer case, the button assembly including a driver having a shoulder and a ramped surface. The push button lock also includes a tail movable relative to the outer case, and a spring retainer coupled to the tail. The shoulder is configured to engage and push the tail axially along a longitudinal axis when the button assembly is in an unlocked and depressed state, and a portion of the spring retainer is configured to be engaged and moved radially outwardly by the ramped surface when the button assembly is in a locked and depressed state.

20 Claims, 16 Drawing Sheets

(56) References Cited

U.S. PATENT DOCUMENTS

| | | | |
|---|---|---|---|
| 8,804,701 B2 | 8/2014 | Covington et al. | |
| 9,412,534 B2 | 8/2016 | Baumann | |
| 11,236,526 B2 * | 2/2022 | Shetty | E05B 1/0038 |

* cited by examiner

PUSH BUTTON LOCK

CROSS-REFERENCE TO RELATED APPLICATION(S)

This application claims priority to U.S. Provisional Patent Application No. 63/357,129, filed on Jun. 30, 2022, the entire contents of which are fully incorporated herein by reference.

FIELD

This disclosure relates generally to push button locks, used for example in automotive settings.

SUMMARY

In one aspect, the disclosure provides a pushbutton lock having an outer case and a button assembly movable relative to the outer case, the button assembly including a driver having a shoulder and a ramped surface. The push button lock also includes a tail movable relative to the outer case, and a spring retainer coupled to the tail. The shoulder is configured to engage and push the tail axially along a longitudinal axis when the button assembly is in an unlocked and depressed state, and the spring retainer is configured to be engaged by the ramped surface when the button assembly is in a locked and depressed state.

In another aspect, the disclosure provides a push button lock having an outer case, and a button assembly movable relative to the outer case, the button assembly including a driver having a shoulder, a ramped surface, and a driver slot. The push button lock also includes a tail movable relative to the outer case. The tail includes a tail slot. The shoulder is configured to engage and push the tail axially along a longitudinal axis when the button assembly is in an unlocked and depressed state, and the shoulder is configured to slide into the tail when the button assembly is in a locked and depressed state.

Other aspects of the disclosure will become apparent by consideration of the detailed description and accompanying drawings.

DETAILED DESCRIPTION

Before any embodiments of the present disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
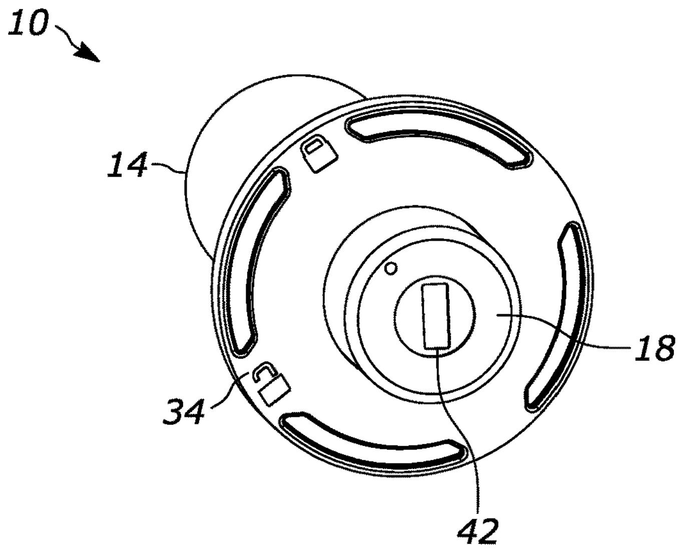
FIG. 1 is a perspective view of a push button lock according to one embodiment of the disclosure.
Figure 2:
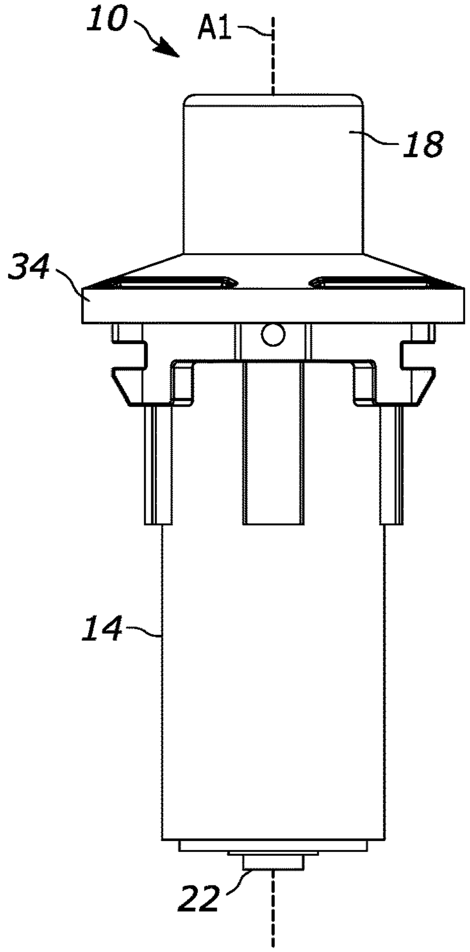
FIG. 2 is a side view of the push button lock of FIG. 1, illustrating a button assembly in a non-depressed state.
Figure 3:
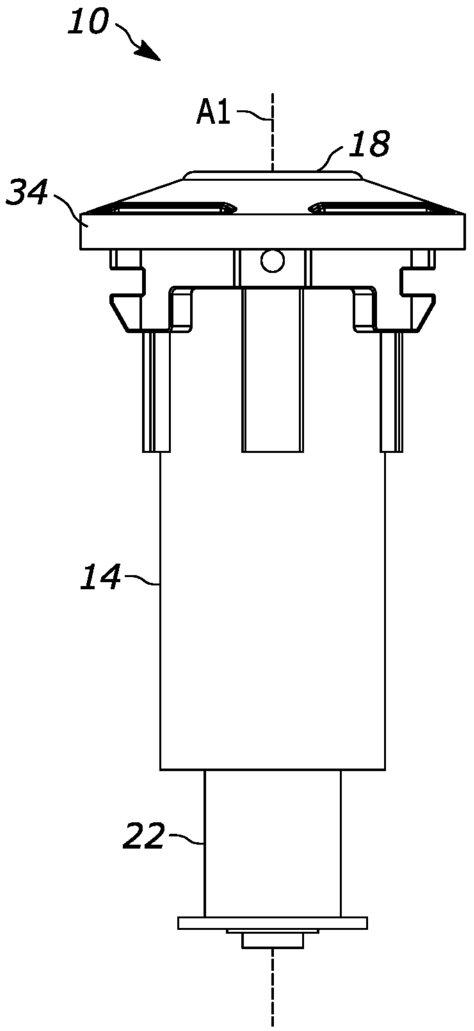
FIG. 3 is a side view of the push button lock of FIG. 1, illustrating the button assembly in an unlocked and depressed state.
Figure 4:
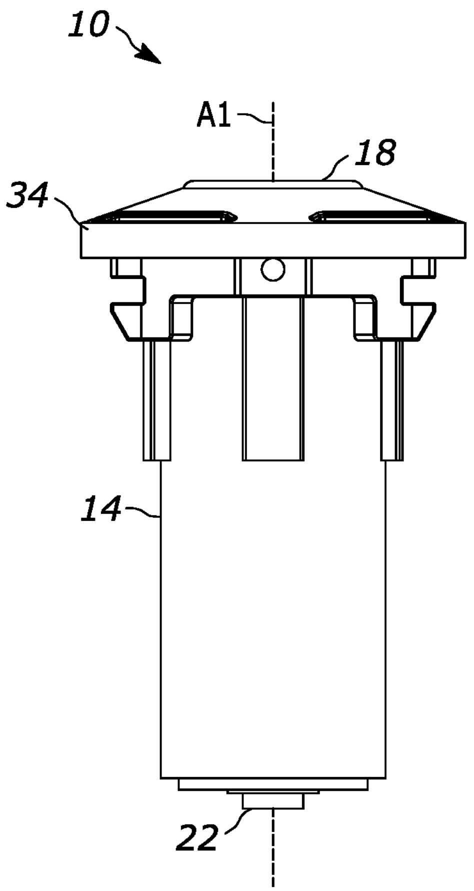
FIG. 4 is a side view of the push button lock of FIG. 1, illustrating the button assembly in a locked and depressed state.

FIGS. 1-4 illustrate a push button lock 10 that includes an outer case 14, a button assembly 18 movable relative to the outer case 14, and a tail 22 movable relative to the outer case 14. As illustrated in FIGS. 2-4, the button assembly 18 is adjustable (e.g., movable linearly) along a longitudinal axis A1 between a non-depressed state (FIG. 2) and a depressed state (FIGS. 3 and 4). As illustrated in FIGS. 5-8, the button assembly 18 includes an inner member 24 (e.g., cylinder) that is also adjustable (e.g., rotatable) about the longitudinal axis A1 between an unlocked state and a locked state (e.g., with a key), such that when the button assembly 18 is depressed in the unlocked state (FIG. 3), the tail 22 is moved linearly away from the outer case 14, and when the button assembly 18 is depressed in the locked state (FIG. 4) the tail 22 does not move linearly away from the outer case 14.

With reference to FIGS. 5-8, in the illustrated embodiment the outer case 14 is a generally elongate, cylindrical, hollow structure that extends along the longitudinal axis A1. The outer case 14 includes a front end 26 and a rear end 30 spaced from the front end 26 along the longitudinal axis A1. Other embodiments may include different shapes and sizes of an outer case 14 than that illustrated.

Figure 5:
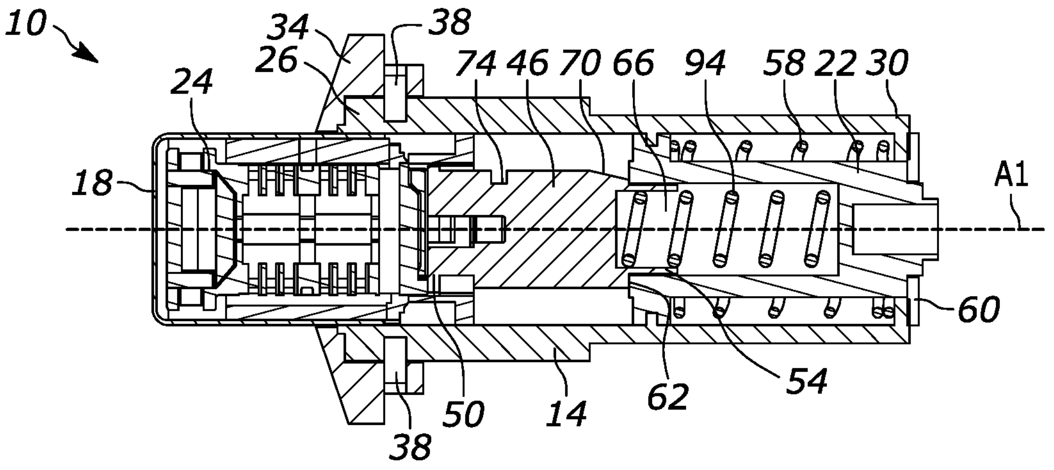
FIG. 5 is a cross-sectional side view of the pushbutton lock of FIG. 1, illustrating the button assembly in the unlocked and non-depressed state.

With reference to FIGS. 1 and 5, a bezel 34 (e.g., a generally circular or ring-shaped bezel 34) is coupled to the front end 26 of the outer case 14. As illustrated in FIG. 1, in the illustrated embodiment the bezel 34 includes symbols along a front of the bezel 34 that indicate both the locked state of the button assembly 18 (e.g., symbol seen on the top of the bezel 34 in FIG. 1) and the unlocked state of the button assembly 18 (e.g., symbol seen on the left side of the bezel 34 in FIG. 1). Other embodiments may include different symbols, or no symbols. As illustrated in FIG. 5, the bezel 34 is coupled to the outer case 14 with steel roll pins 38 that extend radially inwardly toward the longitudinal axis A1. In other embodiments the bezel 34 is coupled to the outer case 14 with structures other than steel roll pins 38, or for example is integrally formed as a single piece with the outer case 14.

With reference to FIG. 1, in the illustrated embodiment the button assembly 18 also includes a central opening 42 for insertion of a key or other structure that may be inserted into the button assembly 18 and used to rotate the inner member 24 of the button assembly 18 (e.g., 90 degrees or other values and ranges of values) about the longitudinal axis A1 between the locked and the unlocked states.

With reference to FIGS. 5-8, a driver 46 is coupled (e.g., directly coupled) to the inner member 24 of the button assembly 18, and is positioned within (e.g., entirely within) the outer case 14. The driver 46 is fixed rotationally to the inner member 24 of the button assembly 18, such that rotation of the inner member 24 of the button assembly 18 about the longitudinal axis A1 between the locked and unlocked states also rotates the driver 46. The driver 46 includes a front end 50 and a rear end 54 spaced from the front end 50 along the longitudinal axis A1. The front end 50 is coupled (e.g., fixed) to the inner member 24 of the button assembly 18, and the rear end 54 either engages (e.g., pushes), or slides into, the tail 22 depending upon whether the button assembly 18 is in the locked state or the unlocked state.

As illustrated in FIGS. 5-8, the tail 22 does not rotate. Rather, the tail 22 is biased axially by a biasing element 58 (e.g., compression spring or other type of spring) toward the driver 46 and the overall button assembly 18, and moves axially depending upon whether the button assembly 18 is in the locked or unlocked state, and whether the button assembly 18 has been depressed. In the illustrated embodiment, the tail 22 includes a stop element 60 (e.g., washer or other projection) that is located outside of the outer case 14. The stop element 60 limits the axial forward movement of the tail 22.

Figure 6:
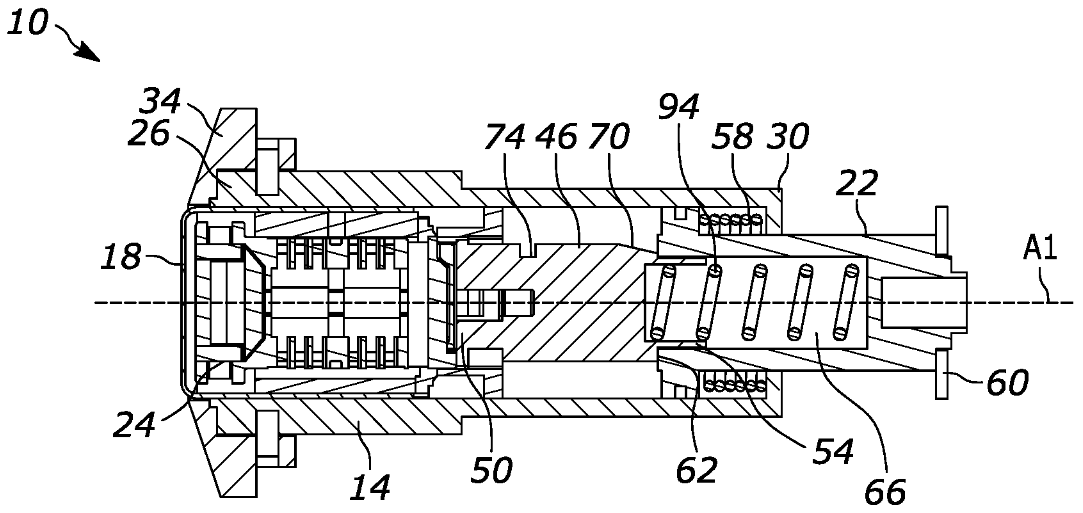
FIG. 6 is a cross-sectional side view of the pushbutton lock of FIG. 1, illustrating the button assembly in the unlocked and depressed state.

With reference to FIGS. 5 and 6, the driver 46 includes a shoulder 62 (e.g., a ledge or surface extending perpendicular to the longitudinal axis A1) that is sized and shaped to engage and push against the tail 22 when the button assembly 18 is in the unlocked state and the button assembly 18 is depressed. Movement of the shoulder 62 against the tail 22 causes the tail 22 to move against the force of the biasing element 58, and causes a portion (e.g., over half) of the tail 22 to extend axially outside of the outer case 14. In the illustrated embodiment the shoulder 62 forms part of, or is adjacent to, the rear end 54 of the driver 46. Additionally, the tail 22 includes a recess 66 that receives at least a portion of the rear end 54 of the driver 46 that extends axially past the shoulder 62, such that the driver 46 is generally centered and/or aligned with the tail 22. Other embodiments may include different locations for the shoulder 62 than that illustrated.

Figure 7:
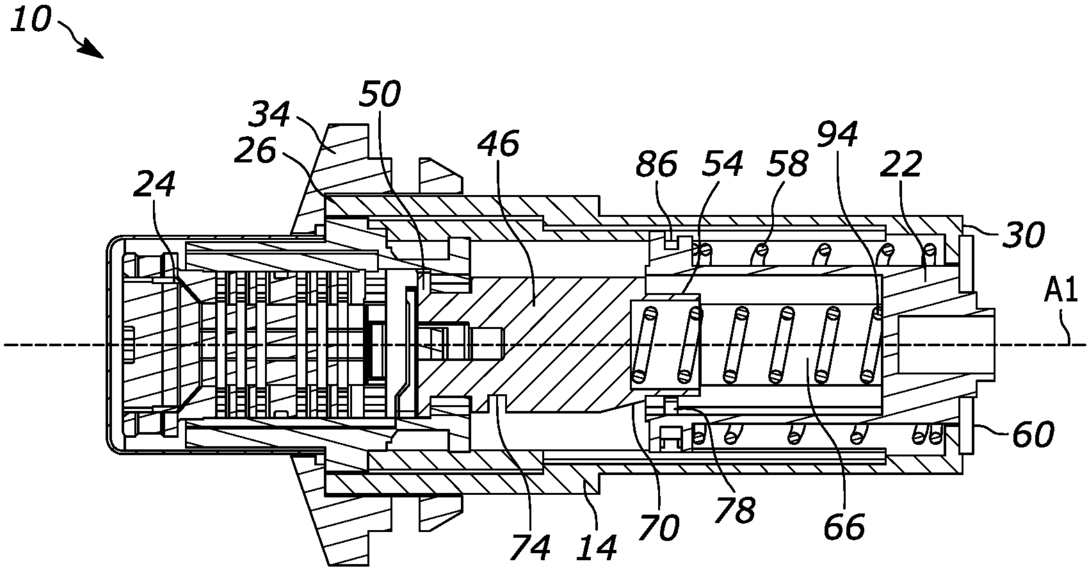
FIG. 7 is a cross-sectional side view of the pushbutton lock of FIG. 1, illustrating the button assembly in the locked and non-depressed state.
Figure 8:
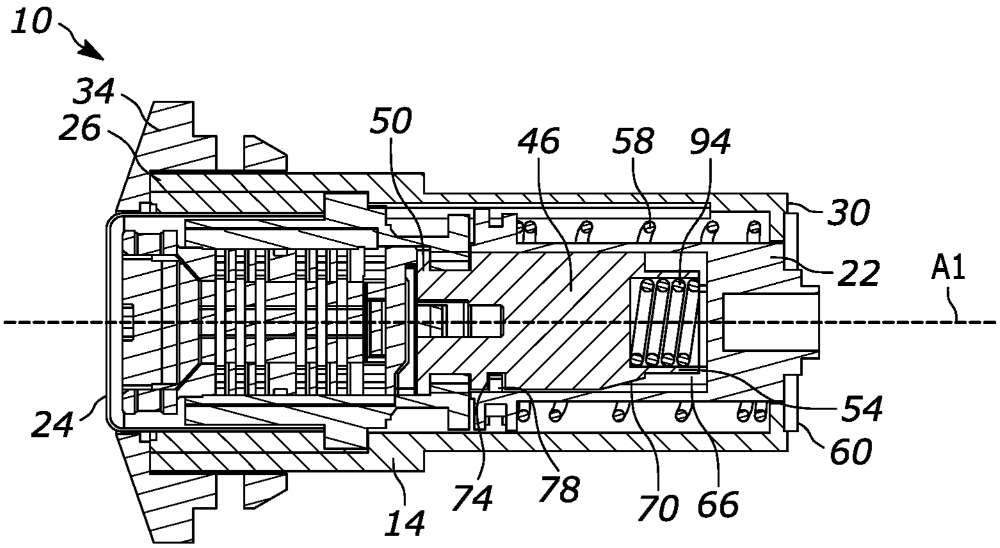
FIG. 8 is a cross-sectional side view of the pushbutton lock of FIG. 1, illustrating the button assembly in the locked and depressed state.
Figure 9:
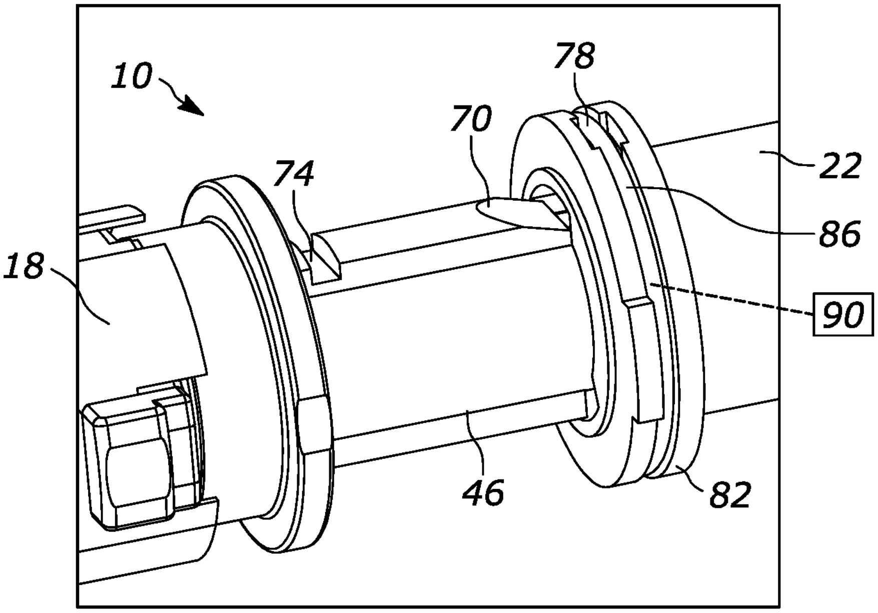
FIG. 9 is a partial, perspective view of a driver and tail of the push button lock of FIG. 1.

With reference to FIGS. 7-9, the driver 46 additionally includes a ramped surface 70, and a driver slot 74 (e.g., groove or other recess), both located along an exterior side of the driver 46. In the illustrated embodiment, the ramped surface 70 forms part of, or is adjacent to, the rear end 54 of the driver 46. The driver slot 74 is spaced from and located axially from the ramped surface 70, closer to the front end 50 of the driver 46. Other embodiments may include different locations for the ramped surface 70 and driver slot 74 than that illustrated.

With continued reference to FIGS. 7-9, the tail 22 includes a detent pin 78. The detent pin 78 extends radially inwardly into the recess 66 of the tail 22, and toward the longitudinal axis A1. In the illustrated embodiment, and as illustrated in FIG. 9, the tail 22 includes a front end 82 having a tail slot 86 (e.g., groove or other recess). A biasing element 90 (e.g., wire spring or other spring, shown schematically) may be positioned in the tail slot 86, and may bias the detent pin 78 radially inwardly toward the longitudinal axis A1. Other embodiments may include different types and arrangements of a biasing element 90 and/or detent pin 78, and also different locations for a biasing element 90 and/or detent pin 78 than that illustrated.

With continued reference to FIGS. 7-9, when the button assembly 18 is in the locked state and is depressed, the driver 46 moves axially into the recess 66 of the tail 22. The driver 46 is sized and shaped such that it fits and slides into the recess 66 without engaging and pushing the tail 22 axially in this state. Thus, the tail 22 remains stationary as the driver 46 moves axially rearwardly within the outer case 14 and into the tail 22. As the driver 46 moves axially rearwardly, the ramped surface 70 of the driver 46 eventually engages and slides over the detent pin 78, forcing the detent pin 78 to move radially outwardly (e.g., against the biasing force of the biasing element 90). As the driver 46 is moves farther into the recess 66 of the tail 22, the detent pin 78 then eventually snaps back radially inwardly and engages the driver slot 74 (e.g., via the biasing force of the biasing element 90), thereby locking the driver 46 axially in in place relative to the tail 22.

With reference to FIGS. 5-8, in some embodiments the button assembly 18 may be coupled to a biasing element 94 (e.g., spring). The biasing element 94 may be located, for example, within the outer case 14 (e.g., in a space defined by the tail 22 and the driver 46, including for example the recess 66). In some embodiments, the biasing element 94 may be coupled to both the button assembly 18 and the outer case 14, or may be coupled for example to both the button assembly 18 and the tail 22. The biasing element 94 may bias the button assembly 18 axially (e.g., forward) along the longitudinal axis A1, such that once the detent pin 78 is released, the button assembly 18 automatically slides forward axially along the longitudinal axis A1, and at least a portion of driver 46 slides forward axially out of the recess 66 of the tail 22.

Figure 10:
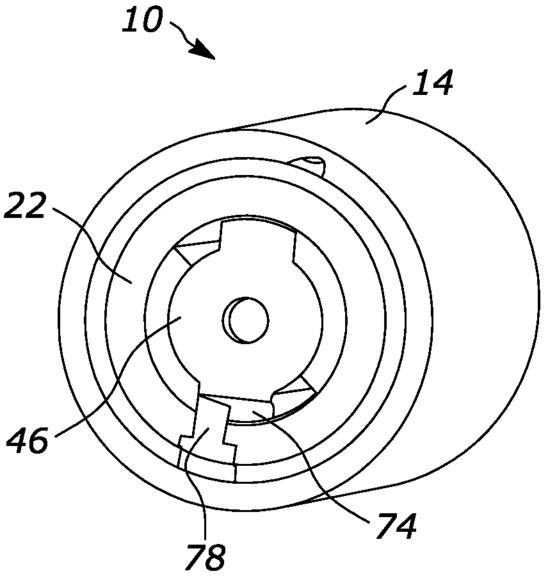
FIGS. 10-12 are cross-sectional, perspective views of the push button lock of FIG. 1, illustrating the button assembly in the locked and depressed state, and illustrating how a driver may be rotated to release a detent pin from the driver and allow the button assembly to return to the non-depressed state
Figure 11:
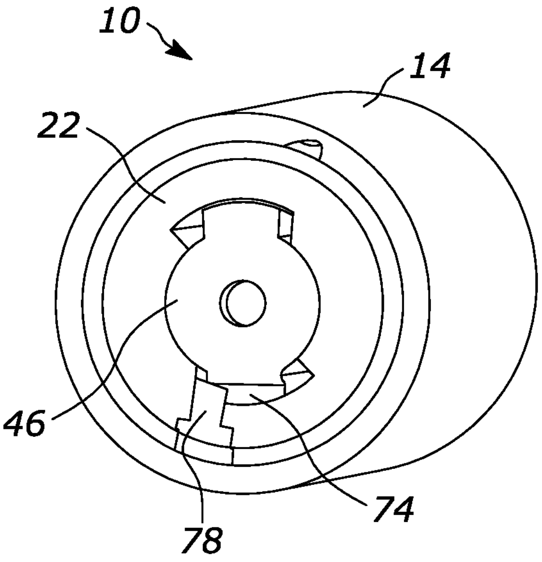
Figure 12:
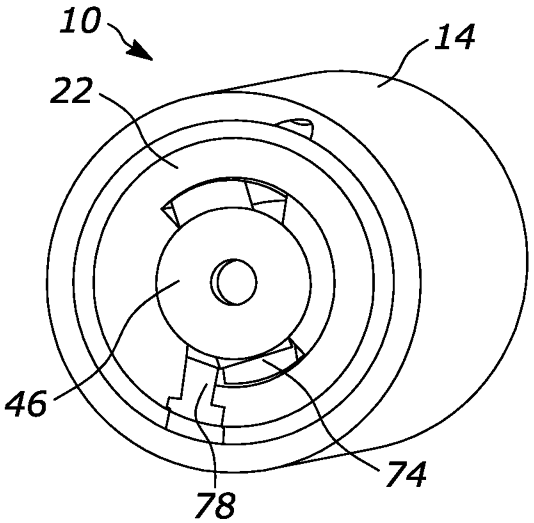
Figure 13:
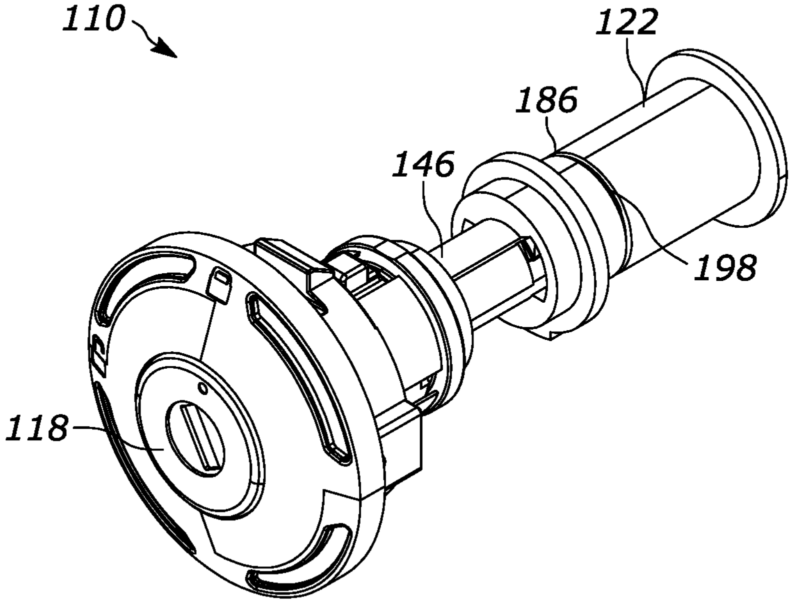
FIG. 13 is a perspective view of a push button lock according to another embodiment.
Figure 14:
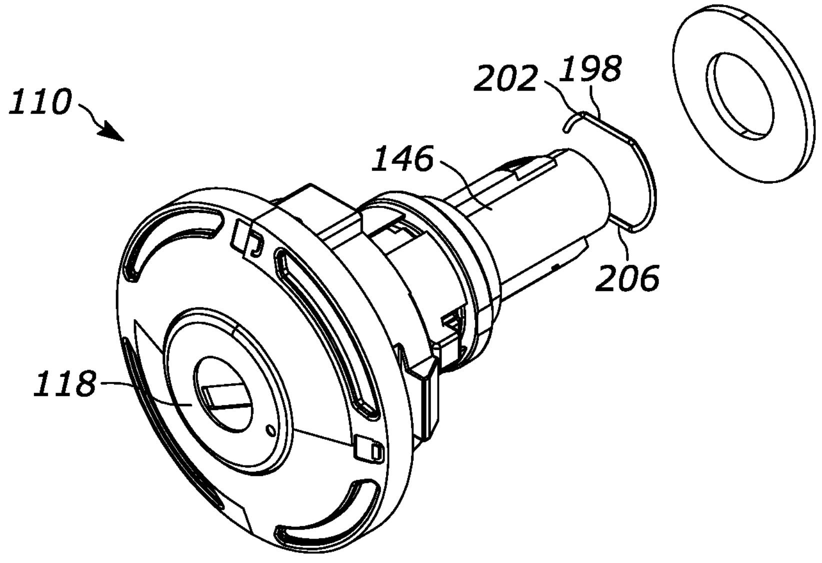
FIG. 14 is an exploded view of the push button lock of FIG. 13.
Figure 15:
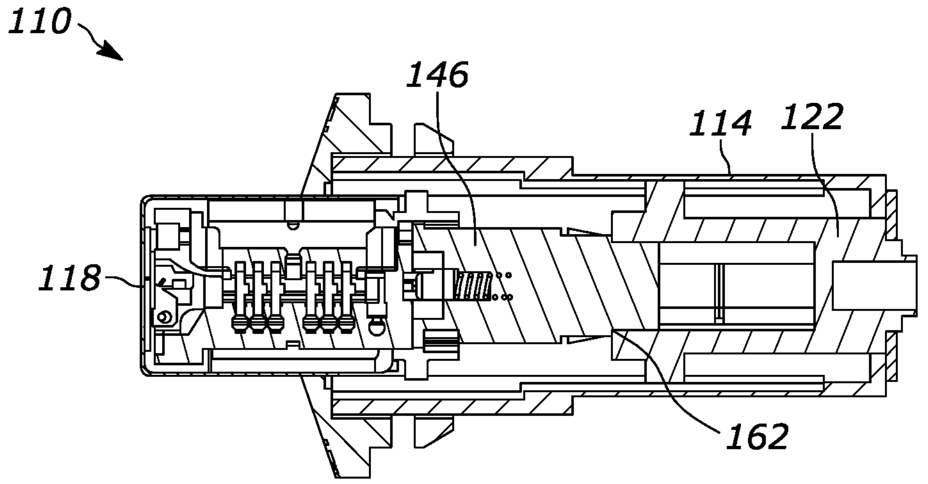
FIG. 15 is a cross-sectional side view of the push button lock of FIG. 13, illustrating the button assembly in the unlocked and non-depressed state.
Figure 16:
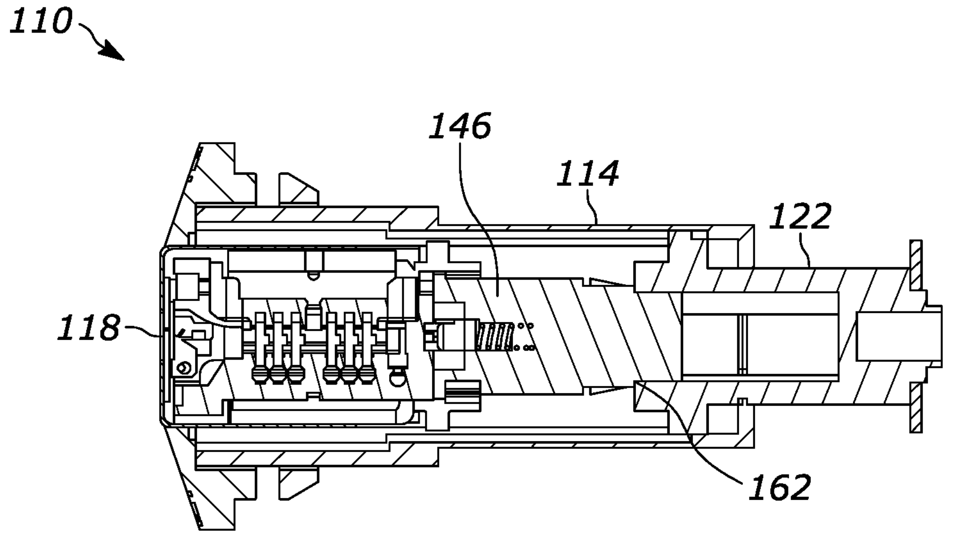
FIG. 16 is a cross-sectional side view of the push button lock of FIG. 13, illustrating the button assembly in the unlocked and depressed state.

With reference to FIGS. 10-12, the detent pin 78 may be released from the driver slot 74 (and the driver 46 may thus be released from the tail 22) by rotating the driver 46 relative to the tail 22 until the detent pin 78 is no longer within the driver slot 74 (FIG. 12). Once released, the driver 46 (and the button assembly 18) are then free to move axially relative to the tail 22 and the outer case 14.

During use, and with reference to FIGS. 1-12, the button assembly 18 may either be in a locked state or an unlocked state, depending upon a rotational position of the inner member 24 and the driver 46 of the button assembly 18. As illustrated in FIGS. 3, 5, and 6, when the button assembly 18 is in the unlocked state, and the button assembly 18 is depressed, the shoulder 62 on the driver 46 engages the tail 22 and pushes the tail 22 axially rearwardly against the biasing force of the biasing element 58, such that the tail 22 is moved axially with the button assembly 18 and the driver 46 at the same time. Conversely, and as illustrated in FIGS. 4, 7, and 8, when the button assembly 18 is in the locked state and the button assembly 18 is depressed, the ramped surface 70 on the driver 46 slides over the detent pin 78, and the driver 46 slides into the stationary tail 22 until the detent pin 78 snaps back radially inwardly into the driver slot 74 on the driver 46, thereby locking the driver 46 to the tail 22. The inner member 24 (and the associated driver 46) may then be rotated, as shown in FIGS. 10-12, to release the detent pin 78 from the driver slot 74, and the button assembly 18 may return to the non-depressed state.

Figure 17:
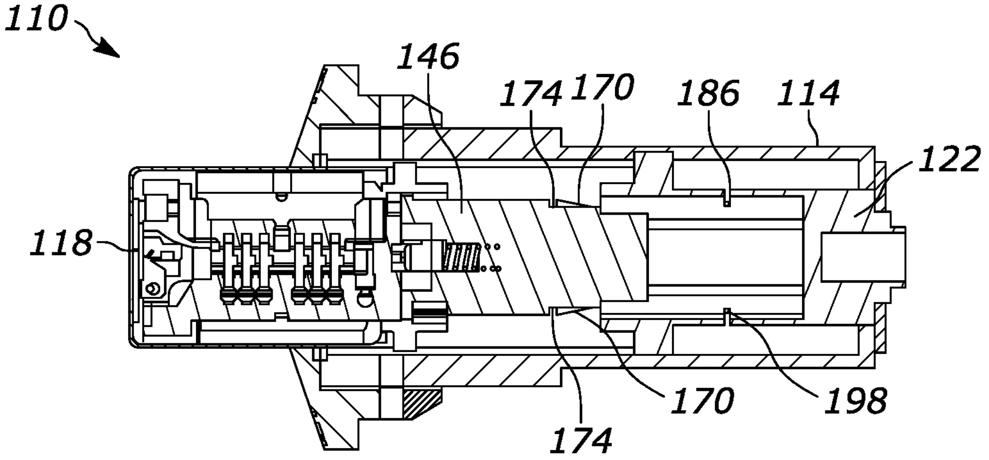
FIG. 17 is a cross-sectional side view of the push button lock of FIG. 13, illustrating the button assembly in the locked and non-depressed state.
Figure 18:
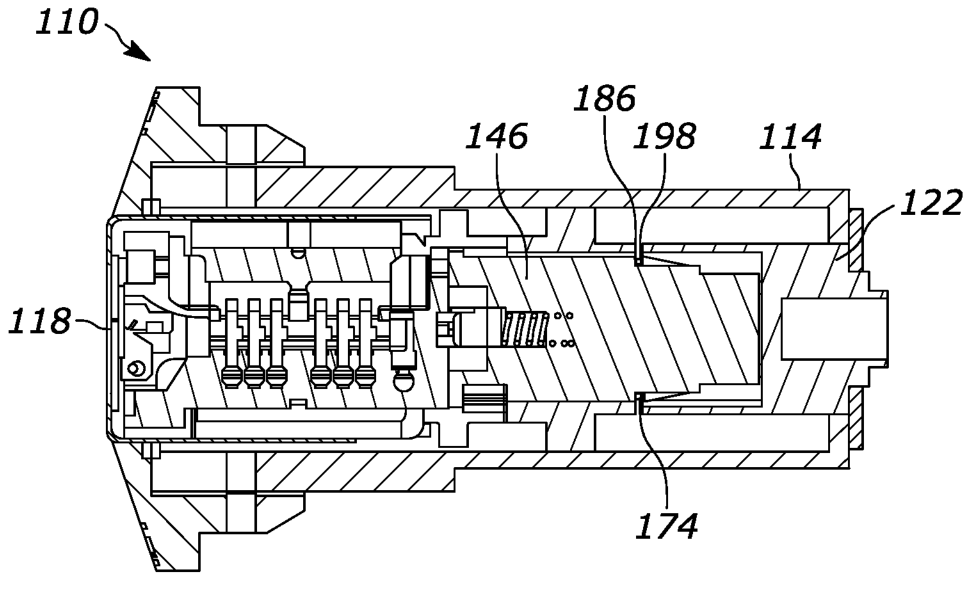
FIG. 18 is a cross-sectional side view of the push button lock of FIG. 13, illustrating the button assembly in the locked and depressed state.
Figure 19:
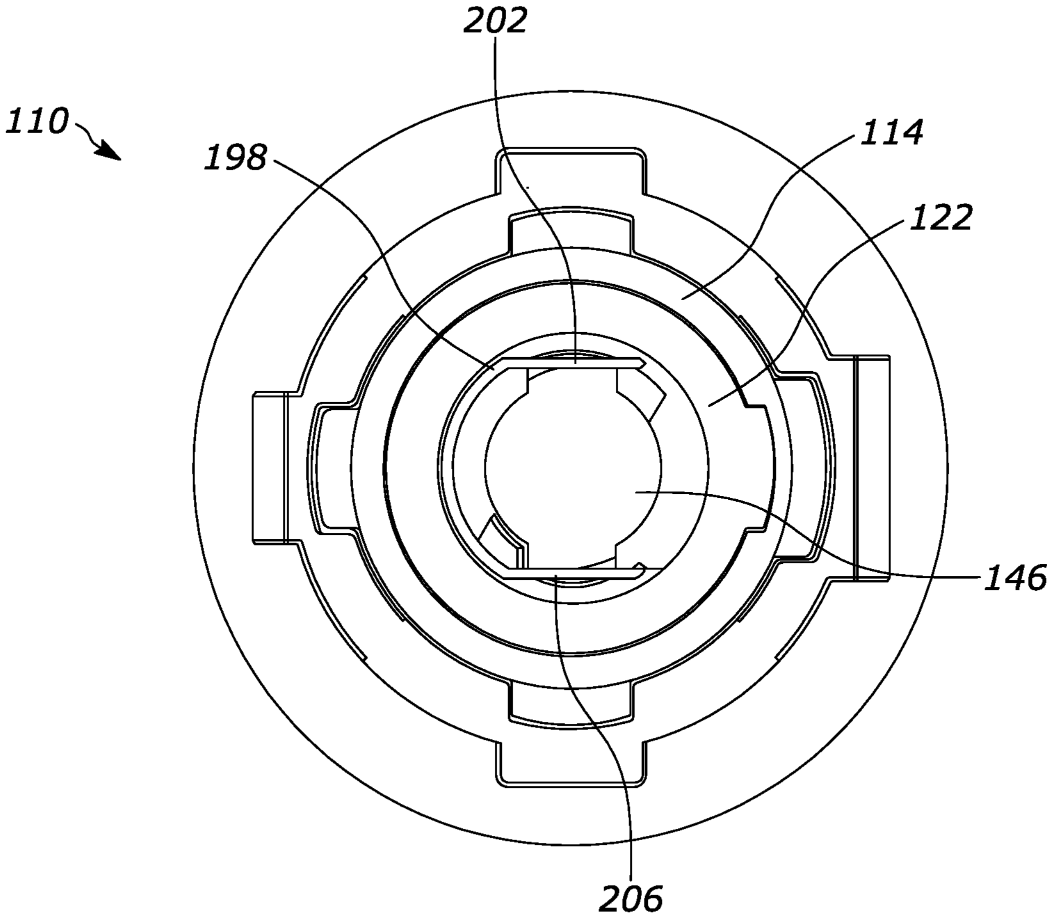
FIG. 19 is another cross-sectional view of the push button lock of FIG. 13.
Figure 20:
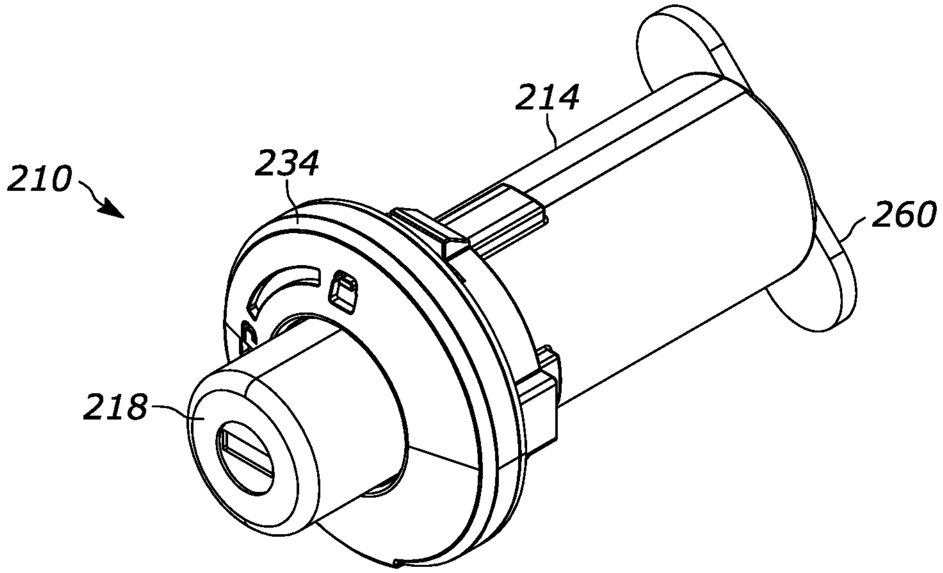
FIG. 20 is a perspective view of a push button lock according to another embodiment, illustrating a button assembly in an unlocked and non-depressed state.
Figure 21:
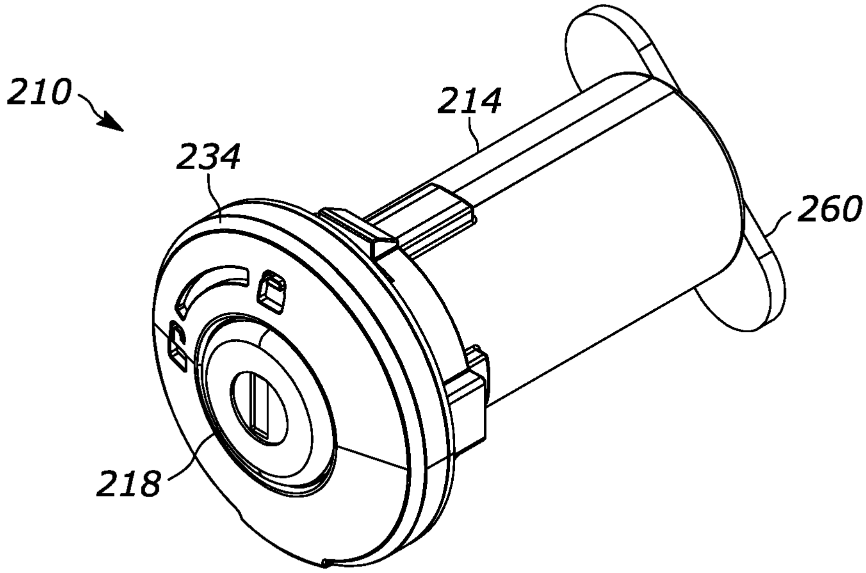
FIG. 21 is a perspective view of the pushbutton lock of FIG. 20, illustrating the button assembly in a locked and depressed state.
Figure 22:
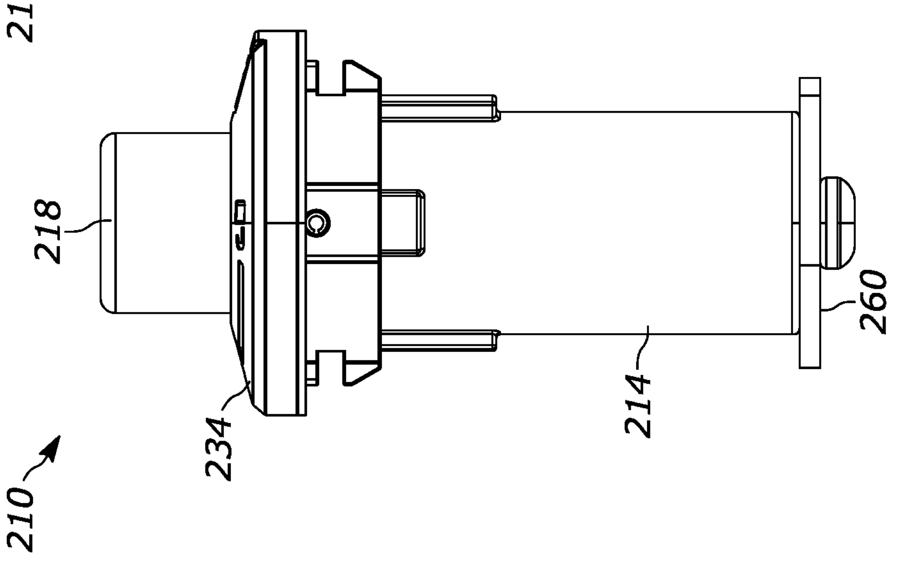
FIG. 22 is a side view of the push button lock of FIG. 20, illustrating the button assembly in the unlocked and non-depressed state.
Figure 23:
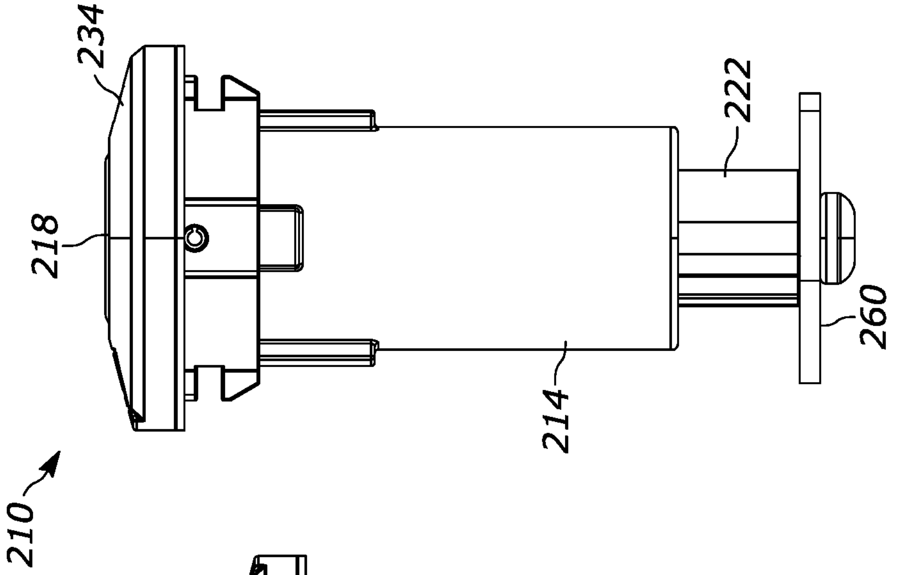
FIG. 23 is a side view of the push button lock of FIG. 20, illustrating the button assembly in an unlocked and depressed state.
Figure 24:
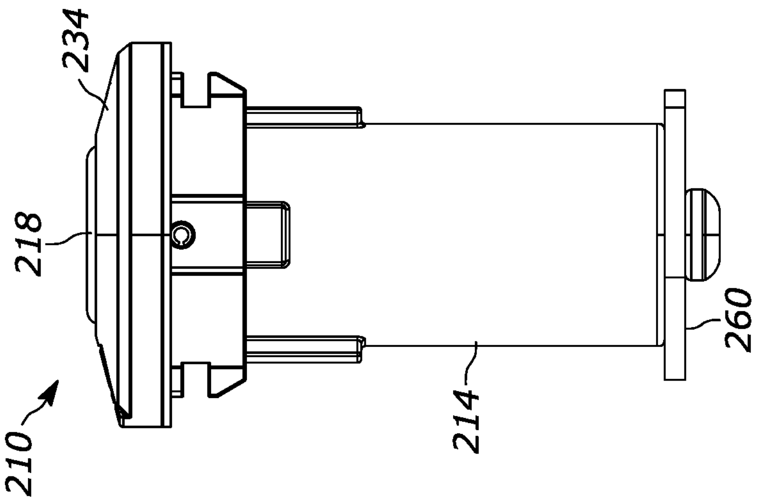
FIG. 24 is a side view of the push button lock of FIG. 20, illustrating the button assembly in the locked and depressed state.

FIGS. 13-19 illustrate a push button lock 110. The push button lock 110 includes an outer case 114, a button assembly 118 movable relative to the outer case 114, a tail 122 movable relative to the outer case 114 and having a tail slot 186 (e.g., groove or other recess), and a driver 146 having a shoulder 162, a ramped surface 170, and a driver slot 174. The push button lock 110, however, does not include a sliding, biased detent pin (such as detent pin 78). Instead, the pushbutton lock 110 includes a spring retainer 198 (i.e., a detent spring). As illustrated in FIGS. 13-18, the spring retainer 198 may have a U-shape that includes a first arm 202 and a second arm 206. The spring retainer 198 may be positioned at least partially within the tail slot 186 (or other slot) along the tail 122, such that the first arm 202 and the second arm 206 are disposed along opposite sides of the tail 122, and are naturally biased inwardly toward one another. As illustrated in FIG. 17, the driver 146 may include two ramped surfaces 170 and two driver slots 174 (as opposed to the single ramped surface 70 and driver slot 74 in FIGS. 1-12). As illustrated in FIGS. 17 and 18, when the button assembly 118 is in the locked state and the button assembly 118 is depressed, the ramped surfaces 170 on the driver 146 push the first arm 202 and the second arm 206 apart from one another (against a biasing force of the spring retainer 198), and the driver 146 slides into the stationary tail 122 until the first arm 202 and the second arm 206 snap back into the driver slots 174 on the driver 146, thereby locking the driver 146 to the tail 122.

Figure 25:
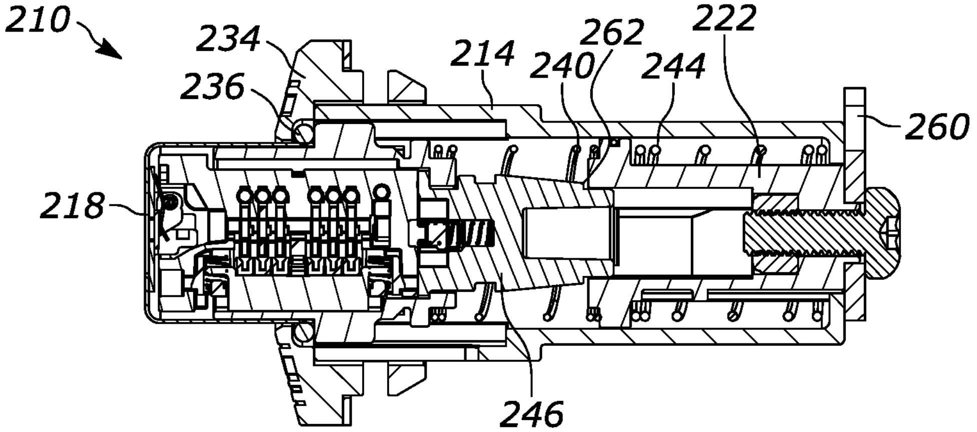
FIG. 25 is a cross-sectional side view of the push button lock of FIG. 20, illustrating the button assembly in the unlocked and non-depressed state.
Figure 26:
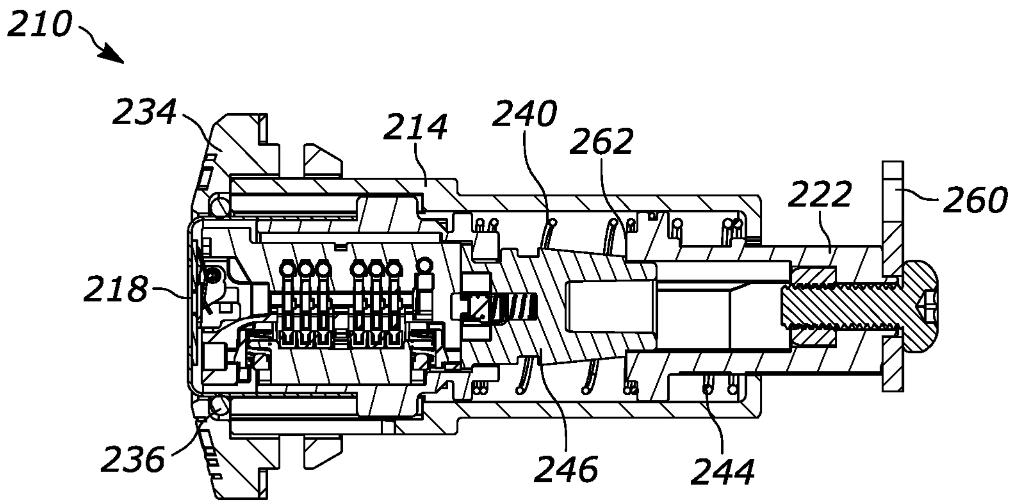
FIG. 26 is a cross-sectional side view of the push button lock of FIG. 20, illustrating the button assembly in the unlocked and depressed state.
Figure 27:
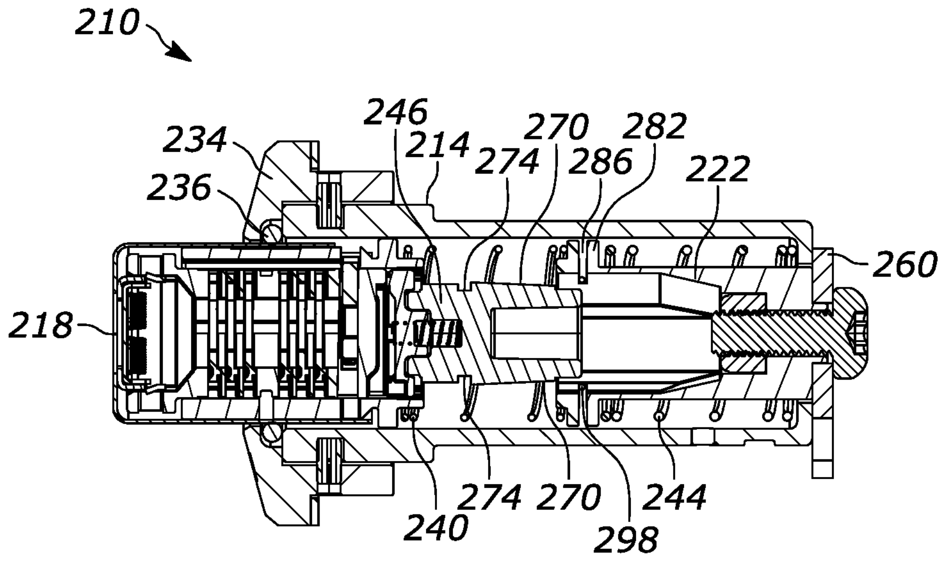
FIG. 27 is a cross-sectional side view of the push button lock of FIG. 20, in the locked and non-depressed state.
Figure 28:
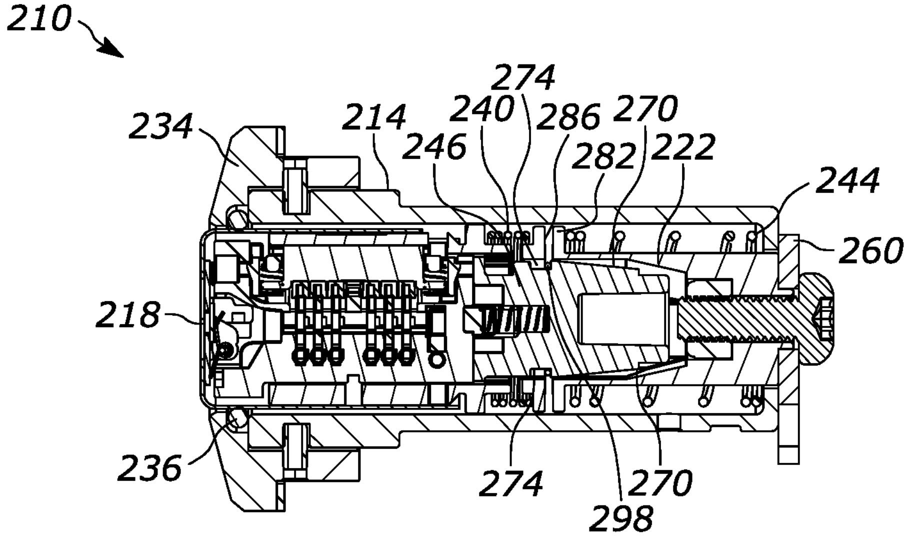
FIG. 28 is a cross-sectional side view of the push button lock of FIG. 20, in the locked and depressed state.
Figure 29:
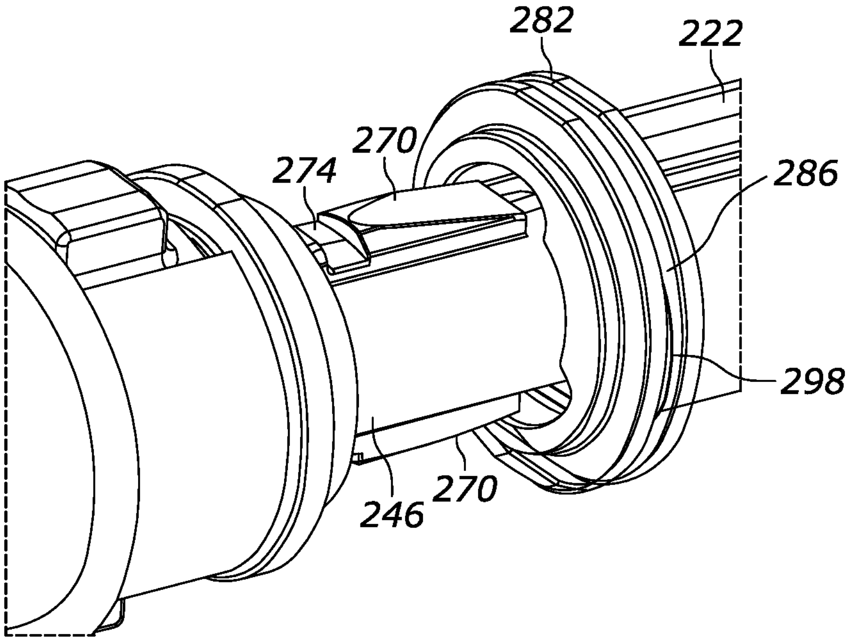
FIGS. 29 and 30 are partial, perspective views of a driver and tail of the push button lock of FIG. 20, illustrating a detent spring.
Figure 30:
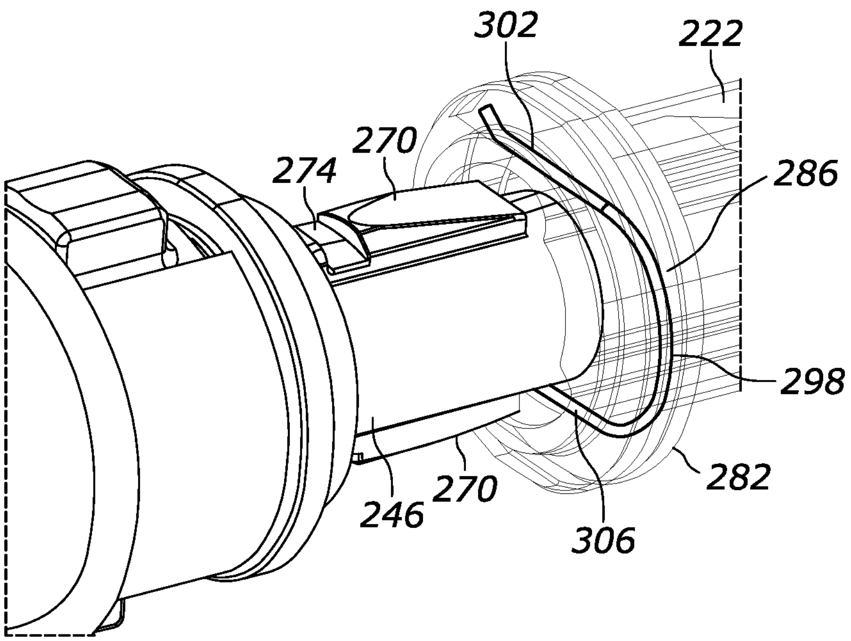
Figure 31:
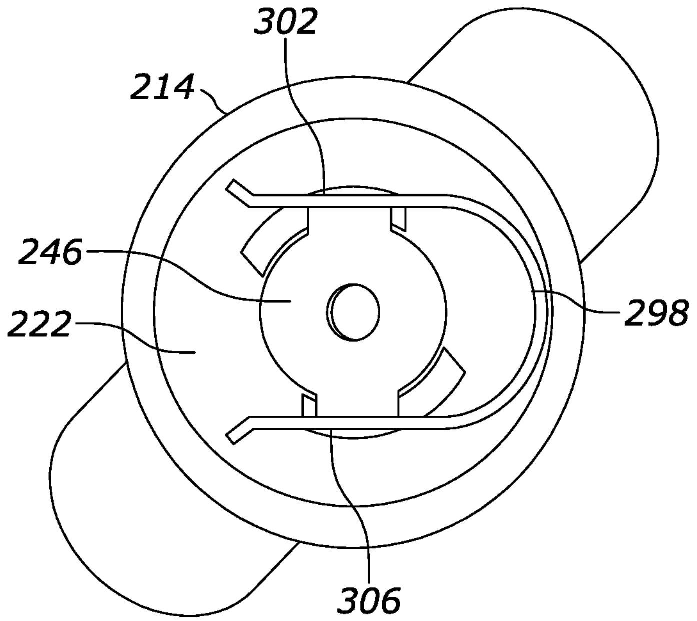
FIGS. 31 and 32 are cross-sectional views of the push button lock of FIG. 20, further illustrating the detent spring.
Figure 32:
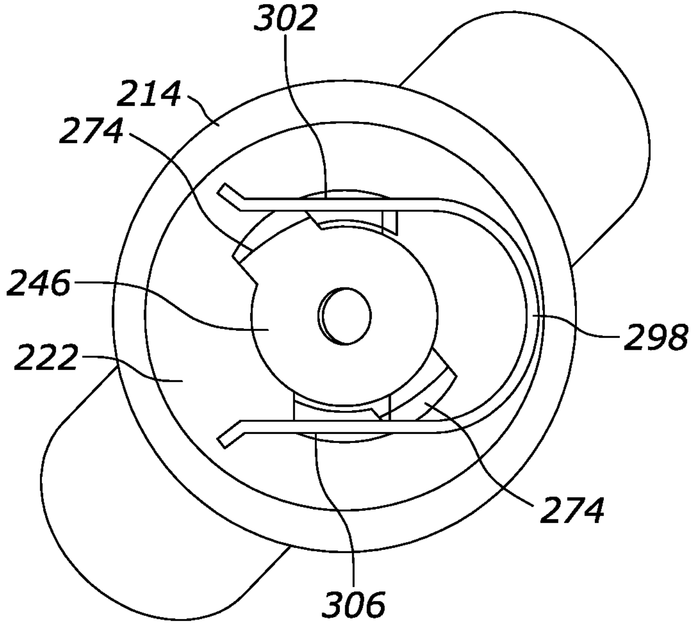

FIGS. 20-32 illustrate a push button lock 210. The push button lock 210 includes an outer case 214, a button assembly 218 movable relative to the outer case 214, a tail 222 movable relative to the outer case 214 and having a tail slot 286 (e.g., groove or other recess) (FIGS. 27-30), and a driver 246 having each of a shoulder 262 (FIGS. 25 and 26), ramped surfaces 270 (FIGS. 27-30), and driver slots 274 (e.g., grooves or other recesses) (FIGS. 27-32). In the illustrated embodiment, the ramped surfaces 270 include first and second ramped surfaces 270 positioned opposite one another along the driver 246, and the driver slots 274 include first and second driver slots 274 positioned opposite one another along the driver 246 and adjacent the ramped surfaces 270. In the illustrated embodiment, the driver slots 274 are generally rectangular slots, although other embodiments include other shapes. The push button lock 210, however, does not include a sliding, biased detent pin (such as detent pin 78). Instead, the pushbutton lock 210 includes a spring retainer 298 (i.e., a detent spring).

As illustrated in FIGS. 29-32, the spring retainer 298 may have a U-shape that includes a first arm 302 and a second arm 306. The spring retainer 298 may be positioned at least partially within the tail slot 286 (or other slot) along the tail 222, such that the first arm 302 and the second arm 306 are disposed along opposite sides of the tail 222, and are naturally biased inwardly toward one another. As illustrated in FIGS. 27-30, the location of the spring retainer 298 is generally at a front end 282 of the tail 222, as compared to the location of the spring retainer 198 in FIGS. 13-19 that is located more centrally along the tail 122. With reference to FIGS. 27-32, in the illustrated embodiment the driver 246 includes two ramped surfaces 270 and two driver slots 274. When the button assembly 218 is in the locked state and the button assembly 218 is depressed, the ramped surfaces 270 on the driver 246 push the first arm 302 and the second arm 306 apart (e.g., radially apart) from one another against a biasing force of the spring retainer 298, and the driver 246 (including the shoulder 262) slides into the stationary tail 222 until the first arm 302 and the second arm 306 snap back into the driver slots 274 on the driver 246, thereby locking the driver 246 to the tail 222. To release the spring retainer 298, the button assembly 218 is rotated (FIGS. 31 and 32), until the spring retainer 198 is no longer positioned within the driver slots 274.

With continued reference to FIGS. 20-28, in the illustrated embodiment the push button lock 210 also includes a bezel 234 (e.g., a generally circular or ring-shaped decorative bezel 234) coupled to the outer case 214. The bezel 234 may include, for example, symbols along a front of the bezel 234 that indicate both the locked state of the button assembly 218 (e.g., symbol seen on the top of the bezel 234 in FIG. 21) and the unlocked state of the button assembly 218 (e.g., symbol seen on the left side of the bezel 234 in FIG. 21). As illustrated in FIGS. 25-28, in some embodiments the push button lock 210 also includes a seal (e.g., O-ring seal) 236 positioned and/or captured between the bezel 234 and the outer case 214.

With continued reference to FIGS. 25-28, in the illustrated embodiment the push button lock 210 also includes a first compression spring 240 within the outer case 214 that is positioned between the button assembly 218 and the tail 222, and a second compression spring 244 that is positioned between the tail 222 and the end of the outer case 214. The first and second compression springs 240, 244 bias the button assembly 218 and the tail 222 axially (to the left in FIGS. 25-28) toward the non-depressed state. The tail 222 also includes a stop element 260 that limits axial movement of the tail 222.

Although the disclosure has been described in detail referring to certain preferred embodiments, variations and modifications exist within the scope and spirit of one or more independent aspects of the disclosure as described.

What is claimed is:

1. A push button lock comprising:

an outer case;

a button assembly movable relative to the outer case, the button assembly including a driver, wherein the driver includes a shoulder and a ramped surface;

a tail movable relative to the outer case; and a spring retainer coupled to the tail;

wherein the shoulder is configured to engage and push the tail axially along a longitudinal axis when the button assembly is in an unlocked and depressed state, and wherein the driver is configured to move axially along the longitudinal axis relative to the tail, such that a portion of the spring retainer is configured to be engaged and moved outwardly by the ramped surface, when the button assembly is in a locked and depressed state.

2. The push button lock of claim 1, wherein the driver includes a driver slot, wherein the spring retainer is configured to snap into the driver slot.

3. The push button lock of claim 2, wherein the driver slot is positioned adjacent the ramped surface.

4. The push button lock of claim 3, wherein the ramped surface is a first ramped surface and the driver slot is a first driver slot, wherein the driver includes a second ramped surface positioned opposite the first ramped surface, and a second driver slot positioned opposite the first driver slot, wherein the second driver slot is positioned adjacent the second ramped surface.

5. The push button lock of claim 2, wherein the tail includes a tail slot, wherein the spring retainer is positioned at least partially within the tail slot.

6. The push button lock of claim 5, wherein the tail slot is positioned at a front end of the tail.

7. The push button lock of claim 1, wherein the spring retainer is U-shaped.

8. The push button lock of claim 1, wherein the spring retainer includes a first arm and a second arm, wherein the spring retainer is positioned at least partially within a tail slot, such that the first arm and the second arm are disposed along opposite sides of the tail, and are naturally biased inwardly toward one another.

9. The push button lock of claim 8, wherein the ramped surface is configured to engage the first arm and move the first arm outwardly, against a biasing force of the spring retainer.

10. The push button lock of claim 9, wherein the ramped surface is a first ramped surface and the driver slot is a first driver slot, wherein the driver includes a second ramped surface positioned opposite the first ramped surface, and a second driver slot positioned opposite the first driver slot, wherein the second ramped surface is configured to engage the second arm and move the second arm outwardly, against the biasing force of the spring retainer.

11. The push button lock of claim 1, further comprising a bezel coupled to the outer case, and an O-ring seal positioned between the outer case and the bezel.

12. The push button lock of claim 1, further comprising a compression spring positioned between the button assembly and the tail.

13. The push button lock of claim 12, wherein the compression spring is a first compression spring, wherein the push button lock includes a second compression spring positioned between the tail and an end of the outer case.

14. The push button lock of claim 13, wherein the tail includes a stop element that limits axial movement of the tail.

15. The push button lock of claim 1, wherein the button assembly is configured to rotated about the longitudinal axis between the locked state and the unlocked state.

16. A push button lock comprising:

an outer case;

a button assembly movable relative to the outer case, the button assembly including a driver, wherein the driver includes a shoulder, a ramped surface, and a driver slot; and a tail movable relative to the outer case, wherein the tail includes a tail slot;

wherein the shoulder is configured to engage and push the tail axially along a longitudinal axis when the button assembly is in an unlocked and depressed state, and wherein the shoulder is configured to slide axially along the longitudinal axis within, and relative to, the tail when the button assembly is in a locked and depressed state.

17. The push button lock of claim 16, further comprising a spring retainer positioned at least partially within the tail slot.

18. The push button lock of claim 16, wherein the driver slot is positioned adjacent the ramped surface.

19. The push button lock of claim 18, wherein the ramped surface is a first ramped surface and the driver slot is a first driver slot, wherein the driver includes a second ramped surface positioned opposite the first ramped surface, and a second driver slot positioned opposite the first driver slot, wherein the second driver slot is positioned adjacent the second ramped surface.

20. The push button lock of claim 16, further comprising a first compression spring positioned between the button assembly and the tail, and a second compression spring positioned between the tail and an end of the outer case.

* * * * *